United States Patent [19]

Bassine

[11] Patent Number: 5,275,642
[45] Date of Patent: Jan. 4, 1994

[54] MOLECULAR SIEVE FOR OXYGEN CONCENTRATOR

[76] Inventor: Stuart Bassine, 4470 Hancock Bridge Pkwy., North Fort Myers, Fla. 33903

[21] Appl. No.: 994,167

[22] Filed: Dec. 21, 1992

Related U.S. Application Data

[63] Continuation of Ser. No. 717,354, Jun. 18, 1991, abandoned, which is a continuation-in-part of Ser. No. 353,015, May 17, 1989, abandoned.

[51] Int. Cl.$^5$ ............................................. B01D 53/04
[52] U.S. Cl. ................................. 96/149; 96/133; 96/146
[58] Field of Search ............. 55/23, 28, 33, 62, 74, 55/75, 161-

[56] References Cited

U.S. PATENT DOCUMENTS

| | | | |
|---|---|---|---|
| 1,944,279 | 1/1934 | Skelton | 55/475 |
| 2,199,258 | 4/1940 | Gray | 55/316 X |
| 2,586,670 | 2/1952 | Lambertsen | 55/475 X |
| 2,593,132 | 4/1952 | Gannon | 55/316 X |
| 2,746,845 | 5/1956 | Guild | 55/316 X |
| 3,016,978 | 1/1962 | Hull | 55/179 |
| 3,024,867 | 3/1962 | Milton | 55/389 X |
| 3,080,977 | 3/1963 | Jones | 55/316 X |
| 3,186,150 | 6/1965 | Zankey | 55/475 X |
| 3,323,292 | 6/1967 | Brown | 55/179 X |
| 3,483,677 | 12/1969 | Pinto | 55/316 |
| 3,490,205 | 1/1970 | Hauser | 55/389 X |
| 4,272,265 | 6/1981 | Snyder | 55/389 |
| 4,322,228 | 3/1982 | Myers et al. | 55/389 X |
| 4,349,357 | 9/1982 | Russell | 55/389 X |
| 4,496,376 | 1/1985 | Hradek | 55/389 X |
| 4,496,378 | 1/1985 | Kish | 55/316 |
| 4,544,385 | 10/1985 | Tanaka | 55/389 X |
| 4,552,571 | 11/1985 | Dechene | 55/389 X |
| 4,584,001 | 4/1986 | Dechene | 55/389 X |
| 4,636,226 | 1/1987 | Canfora | 55/389 X |
| 4,770,678 | 9/1988 | Haslett, Jr. | 55/475 X |
| 4,826,510 | 5/1989 | McCombs | 55/475 X |
| 5,110,330 | 5/1992 | Loughrow | 55/387 X |
| 5,112,367 | 5/1992 | Hill | 55/389 X |

OTHER PUBLICATIONS

D. W. Breck et al., "Molecular Sieves", from Union Carbide Molecular Sieves, reprinted from Scientific American, 1959.

SSII (Sieve Saver II) Theory of Operation, Foothills Medical Equipment, Inc. (not dated).

*Primary Examiner*—Robert Spitzer
*Attorney, Agent, or Firm*—McAulay Fisher Nissen Goldberg & Kiel

[57] ABSTRACT

A molecular sieve for an oxygen concentrator free of internal filtering elements and suitable for personal use to provide substantially pure oxygen for a medical patient to breathe, having a container formed of metal with an inlet thereto and an outlet and seamed with welded seams so as to be leak-proof to moisture and able to withstand passage of hot re-activating gas, an oxygen concentrating molecular sieve material contained within the container and having a longitudinal extent concentric with the longitudinal axis of the container, filter screens and springs contained within the container extending the full diametrical extent of the container and positioned on opposite sides of the sieve material, coaxial with the longitudinal axis of the container, the sieve material being a material, re-activatable by passage therethrough of a hot gas and being sandwiched between the filter screens and springs and maintained in alignment with the longitudinal axis of the container.

15 Claims, 3 Drawing Sheets

MOLECULAR SIEVE FOR OXYGEN CONCENTRATOR

CROSS-REFERENCE TO RELATED APPLICATION

This application is a continuation of application Ser. No. 07/717,354, filed on Jun. 18, 1991, now abandoned, which is a continuation-in-part of application Ser. No. 07/353,015, filed on May 17, 1989, now abandoned.

BACKGROUND OF THE INVENTION

This invention relates to molecular sieves for use in oxygen concentrators and a novel container for use therewith.

More particularly, the invention is concerned with a container having a tubular body and provided with end caps which are seam welded to the tubular body to prevent leakage as well as to assist in the maintenance of the position of the sieve material in the container. The ports of entry and outlet to and from the container are also seam welded to prevent leakage. The oxygen concentrators are primarily intended for home use, so that long life is of extreme importance, as well as to have the ability to be free-standing. The molecular sieve is intended for an oxygen concentrator which is primarily intended for supplying pure oxygen to a patient to breathe and for recharging in the field.

A molecular sieve is a filter comprising a material which has a high affinity for one or more particular gases and therefore can remove such gases by adsorption, thus concentrating the remaining gas or gases.

It is important to prevent the sieve material from moving around in the container in order to ensure an even gas flow. Therefore, alignment of the sieve material is an important requirement, and avoidance of a by-pass around the sieve material is important.

Molecular sieves are used in two main fields. One of these is for large scale, heavy duty preparation of fluids, requiring expensive apparatus and often producing extremely high purities, perhaps of the order of 99.9999% pure. Examples are the preparation of purified atmosphere for use in the manufacture of semi-conductor devices or for spacecraft research. The other main field is for personal use, as for oxygen concentrators, wherein ordinary air is passed through a molecular sieve to adsorb the nitrogen and leave perhaps 95% pure oxygen for a medical patient to breathe. The sieves in this field tend to be much cheaper and smaller.

DESCRIPTION OF THE PRIOR ART

Oxygen concentrators are popularly used to provide sufficiently high purities of oxygen for medical patients without the need of high pressure tanks or liquid oxygen. These machines produce their oxygen by using air compression and valving to pass room air through a molecular sieve comprising a container which holds the sieve material as a sandy type of substance.

This material is one chosen for its ability to attract and absorb nitrogen molecules while letting oxygen molecules pass through the sieve material. This concentrates the oxygen to perhaps 95%, whereas, in room air, it is present only to the extent of about 21%. However, one major problem with molecular sieves for oxygen concentrators is that they readily absorb water molecules and, when this occurs, the molecular sieve will no longer perform the primary function of absorbing nitrogen nor concentrating oxygen. Difficulty arises because the molecular sieve will absorb moisture from the room air via any leak in the oxygen concentrator. Therefore, sealing is an important feature, and poor sealing creates problems.

In the past, molecular sieves for this purpose have been contained in glued PVC, in gasket-sealed metal containers and in gasket-sealed plastics. Gaskets are known to leak as well as age and lose their pliability. Port fittings (for the ingress and egress of the air being processed) have been taped and screwed into these containers. Such connections also, in time, lose their sealability, and extraneous leakage results. Unfortunately, almost all of these containers tend to leak because of the number of leakage areas related to connections and provide a means for room air to gain access to the sieve material, thus destroying its ability to concentrate oxygen.

Once water vapor has intruded into the sieve material, the sieve must be disposed of and replaced, or the sieve material must be removed and exposed to high temperatures of the order of 500° F. (260° C.) and vacuum in order to remove the water vapor. Attempts have been made to remove the water vapor in situ by a cycle of high vacuum steps, but these have required expensive additions to the oxygen concentrators.

A "molecular sieve material" is normally a zeolite, which is formed of hydrated aluminosilicates and group II elements having a crystalline framework.

Wall thickness of containers used heretofore have been about one quarter of an inch or about 6.35 millimeters.

The inventor is aware of prior art, such as Hauser, U.S. Pat. No. 3,490,205, from the prosecution of the parent application, and this patent discloses a High Pressure Gas Filter System of large and heavy magnitude and intended for industrial use. There is no teaching or appreciation of spring-loading the sieve material to prevent its moving around or dislocation. The lack of any structure to prevent the sieve material from moving around does not ensure an even gas flow, and the gas can escape from the material. The fittings are of the conventional type and not welded so that there is no certainty that leak problems due to temperature expansion are eliminated. There is no disclosure of using filters and screens extending the full diameter of the vessel so that there is no internal filtering element.

The inventor is also aware of U.S. Pat. No. 3,024,867 to Milton which discloses the use of zeolite as a molecular sieve material, and the use of two molecular sieve beds so that one bed is in an adsorption stroke and the other bed is in the desorption stroke. While Milton is concerned with reactivation of the sieve material, there is no concept of leakproofing to moisture and being free of gasket material.

Gannon, U.S. Pat. No. 2,593,132, discloses a container in which only one end is welded and the other end is screwed onto the container so that desiccant material contained therein can be removed, baked out to remove the adsorbent moisture, and then replaced into the container.

The inventor is also aware of Hradek, U.S. Pat. No. 4,496,396, which discloses a fluid separator apparatus employing a container having an adsorption material positioned between two plates, and in one embodiment the adsorbent material is placed into a container of varying diameter. The conical container is provided to compensate for any decrease in flow of fluid mixture resulting from adsorption of the element by the material. The containers are schematically shown without a clear description of their detailed structure and specific arrangement of parts, and there is no suggestion or teaching of welding seams between end caps and the tubular body and the port fittings.

Dechene, U.S. Pat. No. 4,552,571, discloses end caps and ports of entry and egress associated with the end caps, but there is no teaching of welding the end caps or the ports as well as the arrangements of the inner sieve material and springs.

SUMMARY OF THE INVENTION

An object of the present invention is to ameliorate the situation and overcome the problems with the prior art resulting from leakage through the seams.

The present inventor, after much research, realized that the most efficient method of reactivation is in situ and, although never before successfully applied in the field of oxygen concentrators, is a method of heating; for this purpose, he finally resolved on a method of passing hot gas through a molecular sieve and designing a sieve container that would stand up to the temperature and pressure requirements of this process.

According to the invention, a molecular sieve is provided for use in an oxygen concentrator. The molecular sieve comprises an oxygen concentrating molecular sieve material and a container for the same, wherein the material can be reactivated by passage therethrough of a hot reactivating gas. An important feature is that the container is fabricated of metal and is seamed with all seams welded so as to be leakproof to moisture while being free of gasket material, so that the sieve is capable of withstanding the passage of the hot reactivating gas therethrough. The welded seams which seal all the interconnected parts, end caps to tubular body and ports to the end caps prevent the ingress of atmospheric water vapor into the container so that the container is completely airtight (other than by way of the port fittings for ingress and egress of gas being treated). This avoids any need to use gaskets or O-rings which are easily tractable and can shrink or burn, to use plastics which can melt, as well as any other material which might cause misalignment of end caps or loosened port fittings.

Another object of the invention is to provide small, inexpensive, rugged, reusable molecular sieves (zeolite) for oxygen concentrators that preferably enable the associated operating apparatus of the molecular concentrator to be simple, rugged, easy, inexpensive and quick to operate.

To this end, the molecular sieve material is chosen so that the reactivating temperature of the hot gas does not have to exceed 260° C. or 500° F., and the material preferably comprises aluminum oxide. The material is held in place by heat-resistive metal components, and the components comprise filter screens, retainers and springs.

An important feature of the invention is that the sieve can be reactivated by reheating without the necessity of having to remove the end caps and thereby disturb the sealing. The seam welding of the end caps to the tube is sufficient to maintain the end caps and tube as an unitary structure which can be subjected to high pressures when the sieve is reactivated, so that such reactivation can take place in the field. Clearly, the elimination of gaskets which results from the seam welding is a distinct advantage of the sieve according to the invention over heretofore known sieves.

This invention, therefore, proposes seam welding to eliminate leak problems due to temperature expansion while, at the same time, dispensing with the use of gaskets or sealants, as well as facilitating recharging in the field.

Further, to this end, the container can be made entirely of aluminum, with a substantial wall thickness, usefully in the range from 1 to 5 mm, preferably about 2 mm but desirably within a range of 1.5 to 2.1 mm (0.60 to 0.80 inches), and this has been found to be cost efficient and result in a lighter unit than a similar unit fabricated from steel. This is to be compared with the prior art which requires a wall thickness of about 6.35 millimeters or about one quarter of an inch.

A preferred configuration of the container is in the form of a tube with end caps and port fittings fitted to the caps, all welded together along seams therebetween. The seams and fittings are welded to provide a leak-proof vessel to withstand the temperatures of 500° F. or 260° C. regeneration gases which can be passed through the port fittings without damage to the air-tightness of the joints.

With the present invention, the end caps are welded to the central tubular body while the internal springs are held under a spring tension of forty (40#) pounds and the springs and end caps are welded together to the tubular member at the same time.

Further, retainers are provided which are also connected with the springs so as to assist in holding the sieve material in place and prevent shifting.

To avoid stress on the welded joints at the ends of the sieve container, the caps extend towards each other so that the seams between these and the tube are a substantial distance from the ends of the container. The distance can usefully be in the range 2 to 4 cm, preferably 2.5 cm or one (1) inch. The lower direction of 2 cm or about 182 " is chosen so that the ports are welded to the end caps and thereby avoid a further welding to the tubular body so as to avoid excess seaming on the tubular body.

The sieve can be designed so that one end of the container has a flat or otherwise non-projecting configuration so as to be able to serve as a base on which the sieve can stand. If the port fittings are fitted to the sides of the container (conveniently to the caps) and do not project beyond the ends of the container, they can have the maximum length consistent with the space available for it and can then contain the maximum amount of sieve material.

Better flow is able to be provided if the port fittings comprise radiussed tubes free of sharp bends. Flow is also improved by having the filter element arranged to allow at least 50% through-flow area.

The seams are preferably heat-welded, but they can be pressure-welded, e.g., by making a suitably large temperature differential fit, as by heating up the outer part and cooling down the inner part until there is a differential between them of 500° C. or 932° F., placing them together and then allowing them to come to the same temperature.

It should be noted that the welding of each end cap to the center tube is an important feature of the invention so as to avoid leakage under heat and the use of gaskets is avoided. With the welding of the various parts together, the sieve can take care of both high temperature and high pressure requirements. Welding the end caps with the springs together prevents the springs from shifting. Additionally, further assistance to prevent shifting of the sieve material is also accomplished by having the retainers connected with the springs. A molecular sieve is like a sponge and, if the sponge shifts, the sieve material will also shift and the air/oxygen gas goes around the sieve material. It is critical that the sieve material be held solid so that the nitrogen will not go around the sieve material. Movement of the sieve material enables the oxygen molecules to come back and not go through the sieve material.

With the present combination, the sieve material together with the intermediation of the springs positioned between the sieve material and the end caps welded thereto provides an extremely efficient manner of holding the sieve material in its appropriate position. Also, when it is desired to reactivate the sieve material, the absorbent mixture can be removed without having to disassemble the entire structural container. The springs at opposite ends also hold the sieve material in place and prevent shifting during the reverse procedure to reactivate the sieve material.

As a result of the combination of the opposed springs and the sieve material sandwiched therebetween all contained within an hermetically sealed container (except for access and egress through the ports), there is no access to the sieve material; the opposed springs maintain the sieve material appropriately aligned therewith so that molecules do not get loaded between the sieve material and the interior walls of the container or go around the sieve material as it moves away from the interior wall.

There is an internal membrane of aluminum which is the molecular sieve, and the internal membrane along the edges of the wall is melted and adheres to the wall. The center portion is not welded, and this is the reason that the springs are necessary to hold the membrane under compression. The center portion of the membrane actually moves but, because of the welding, the edges will stay put but, since the metal moves to the edges, the sealed ends will stay in a better position.

Thick filter material is preferred, because the sieve then retains dust so that no external filter is necessary. In addition, with the springs extending across the full width of the tube diameter, the sieve material is held solidly and prevented from moving so that the material achieves its maximum absorption.

DETAILED DESCRIPTION OF THE INVENTION

Reference is now made to the accompanying drawings, which show the presently preferred mode for carrying out the invention.

Figure 10:
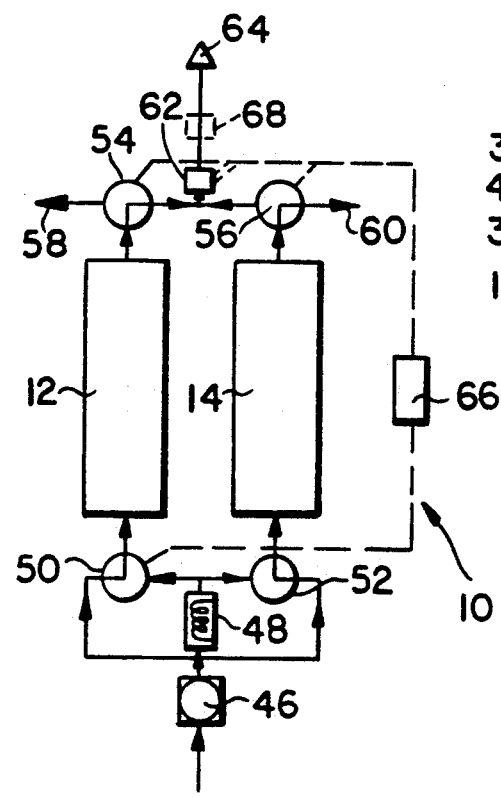
FIG. 10 is a schematic diagram of an oxygen concentrator comprising a molecular sieve according to any of the previous embodiments.

FIGS. 1 to 9 show different embodiments of a molecular sieve for use in the oxygen concentrator shown in FIG. 10. The oxygen concentrator 10 in FIG. 10 includes two identical molecular sieves 12 and 14, One of which, 12, will be described first.

Figure 6:
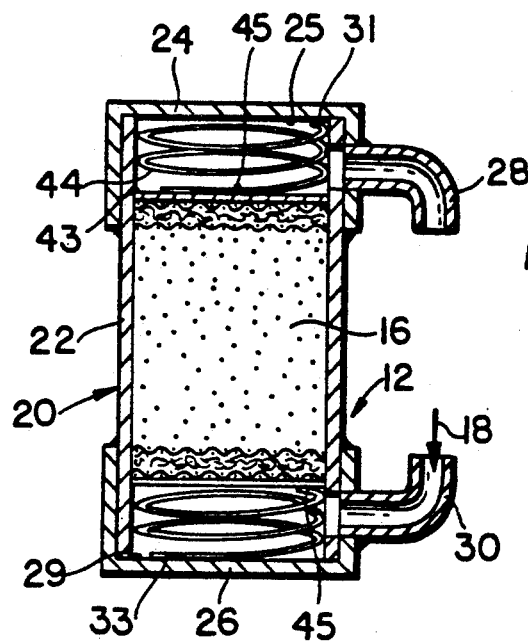
FIG. 6 is a vertical section through the FIG. 2 embodiment.
Figure 7:
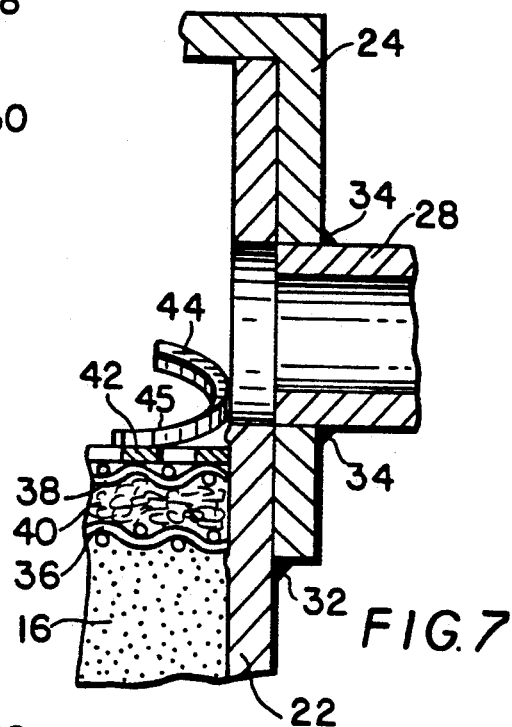
FIG. 7 is an enlarged fragmentary view of part of FIG. 6.

Referring more particularly to FIG. 6, sieve 12 comprises oxygen concentrating molecular sieve material 16 which is a zeolite and is able to be reactivated by passage through it of a hot gas 18 at some temperature up to 260° C. or 500° F. The sieve 12 comprises a container 20 formed as a tube entirely of metal; the preferred metal is aluminum or an aluminum alloy that can be welded to itself and withstand temperatures well above 260° C. For example, the alloy can be welded at a temperature of about 425° C. (797° –800° F.) and can withstand temperatures almost up to 425° C. before being adversely affected. Molecular sieve material 16 together with springs 44, retainers 42, filter screens 36, 38 and 40 all extend across the full diameter of tube 22, and remain in place extended across the full diameter of tube 22, thereby providing excellent flow. Each side of the material is provided with the filter screens and springs 44 for holding the material 16 solid to ensure even gas flow to thereby prevent the gas from escaping from the material.

To make a suitably rigid and durable container that can be readily welded, the thickness of material of which the container wall is made is 1 to 2 mm.

Container 20 which is in the form of the tube 22 is provided with end caps 24 and 26 and port fittings 28 and 30 which are fitted to and welded to the ends caps 24 and 26. End caps 24 and 26 are welded to tube 22 at weldments 32, and ports 28 and 30 are welded to the end caps 24 and 26 at weldments 34 so as to provide a complete welding together along seams formed by the weldments 32 and 34. The caps 24 and 26 extend towards each other so that the seams 32 between these caps 24 and 26 and the tube 22 are a substantial distance from the end of the container 20. This distance, in the FIG. 7 embodiment, is about 2.5 cm or one (1) inch. The distance is selected and preferred for two reasons. One is to provide an area on the outer circumference of the end caps to weld the port fittings 28 and 30. The other reason is to have less stress placed onto the end caps due to the pressure of springs 44.

Figure 1:
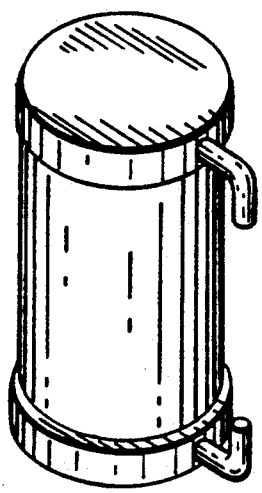
FIG. 1 is a perspective view of one embodiment of a molecular sieve according to the invention.
Figure 2:
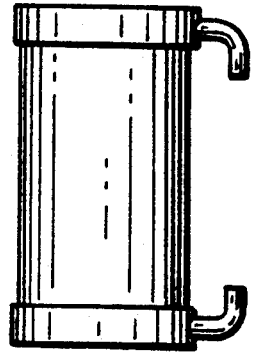
FIG. 2 is a side elevational view of the FIG. 1 embodiment.
Figure 3:
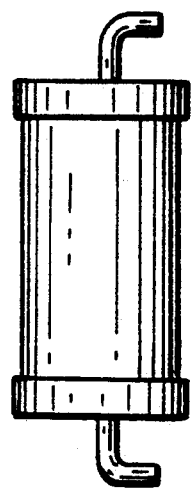
FIG. 3 is a view corresponding to FIG. 2 of an alternative embodiment.
Figure 4:
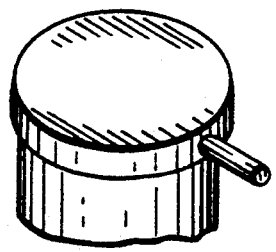
FIG. 4 is a fragmentary perspective view corresponding to FIG. 1 of a modification of the FIG. 1 embodiment.
Figure 5:
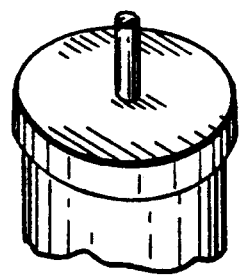
FIG. 5 is a view like FIG. 4 of a modification of the FIG. 3 embodiment.

The exact arrangement of the port fittings such as 28, 30 can be varied according to the configuration of the molecular concentrator 10 and different arrangements are shown in FIGS. 1 to 5, as required. It is thus also possible to interchange the upper port fitting of one embodiment with that of another embodiment, e.g., the FIG. 5 upper port fitting can be associated with the FIG. 1 lower port fitting. As seen in the embodiment of FIGS. 1 and 2, the lower end of the container has a flat (or it could be concave or otherwise non-projecting) configuration so as to be able to serve as a base on which the sieve can stand. Both ends can have this configuration so that, as seen in FIGS. 1 and 2, the port fittings 28, 30 are fitted to the sides of the container 20 and do not project beyond the ends of the container, with the advantages mentioned above. As seen clearly in FIG. 6, the port fittings 28, 30 comprise radiussed tubes without sharp bends.

Within the container 20, the material 16 is held in place by heat-resistive metal components, which components comprise filter screens 36, 38, 40 (of which 36 and 38 are woven wire screens and 40 is a spun aluminum wire screen), retainers 42 of perforated metal with 50% open area and springs 44. Molecular sieve material 16 together with springs 44, retainers 42, filter screens 36, 38 and 40 all extend across the full diameter of tube 22, thereby providing excellent flow. Each side of the material is provided with the filter screens and springs 44 for holding the material 16 solid to ensure even gas flow to thereby prevent the gas from escaping from the material.

The springs 44 are preferably welded to the inner surfaces 25 and 29 of end caps 24 and 26, respectively, at welds 31 and 33 (see FIGS. 6 and 8) to avoid and assist in preventing the springs 44 from shifting after assembly and welding the end caps 24 and 26 to tube 22. To further assist in preventing the retainers 42 from shifting, metal ties 43 are used to tie retainers 42 to springs 44, as best seen in FIG. 8.

Figure 8:
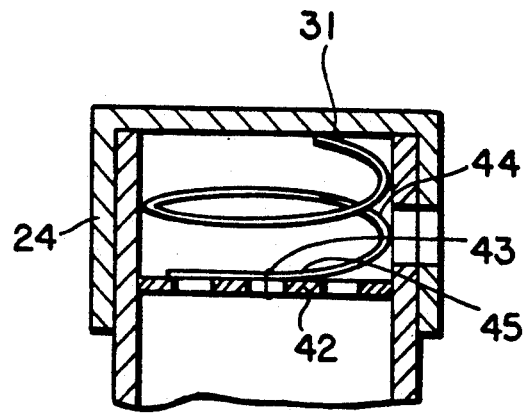
FIG. 8 is a partial schematic view of an end cap of the molecular sieve of FIGS. 1-7 prior to assembly.
Figure 9:
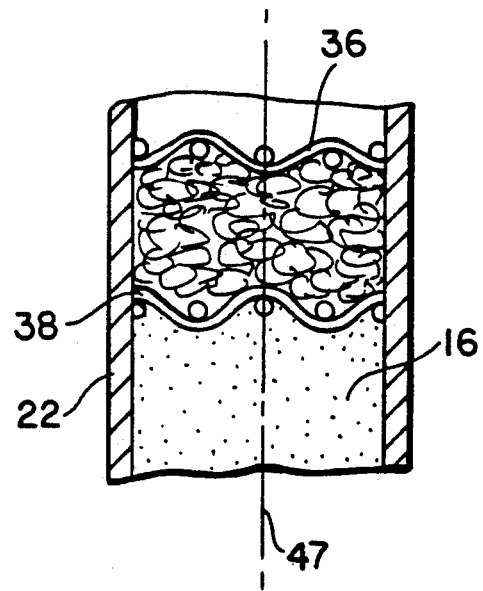
FIG. 9 is a partial schematic view of a tubular body portion forming part of the container for the molecular sieve of FIGS. 1-7, and together with the ends caps of FIG. 8 forms the container.

Referring now more particularly to FIGS. 8 and 9 which show one end cap 24 and tube 22 with sieve material 16 in place. The sieve material is held in place in tube 22 prior to assembly with woven wire screens 36 and 38 in place and the spun aluminum wire screen sandwiched therebetween and bowed outwardly along the longitudinal axis 47 of tube 22. Prior to placement of end caps 24 and 26 onto tube 22, the filter screens 36, 38 and 40 are bowed outwardly. Placement of the end caps 24 and 26 onto tube 22 created pressure onto filter screens 36, 38 and 40 and they are moved into a substantially horizontal or orthogonal position to longitudinal axis 47 and compress the sieve material 16 therebetween. During the welding of the end caps 24 and 26 to the outside of tube 22, the retainer 42 tied to the spring 44 is welded to the inside of the end caps 24 and 26 to hold the retainers 42 in an orthogonal position to the longitudinal axis 47 of the container and, at the same time, hold the sieve material in place between the retainers 42 and the filter screens 36, 38 and 40.

The end caps 24 and 26 can be pushed tightly onto tube 22 so that, with the alignment of springs 44, the molecular sieve material is prevented from shifting.

After assembling the tube 22 with end caps 24 and 26 thereon, the retainers 42 have the bowed position removed as a result of the pressure of the springs 44 onto the retainers 42, and the holding of retainers 42 under spring pressure after assembly.

The screen mesh or filter screens comprising woven wire screens 36, 38 with the spun aluminum wire screen 40 positioned therebetween and forms a sandwich construction and, after assembling, the screen mesh is horizontally directed, or transversely to the longitudinal axis or center of tube 22 so that the cooperation of the retainers 42, springs 44 and screen mesh maintains the molecular sieve material 16 in place and it cannot be moved out of or escape from axial alignment with the geometrical center of tube 22. The end caps 24 and 26 which are welded in place onto tube 22 further assist in maintaining such axial alignment.

The sieve material 16 and the filter screens 36, 38 and 40, and the springs 44 extend across the full diametrical extent of the interior of the container 20 and are substantially orthogonal to the longitudinal center axis of the container 20.

Referring to FIG. 10, in use, air is drawn from the atmosphere by pump 46, passes three ways to a heater 48 and two valves 50, 52 whose action will be explained below. From valves 50, 52 air passes to molecular sieves 12, 14 and through these sieves to valves 54, 56 having exit ports 58, 60 and out to atmosphere through the exit ports and to alternative exit ports connected to a common input to detector 62 and thence to patient 64. The valves 50, 52, 54, 56 are of a cylindrical type with an L-shaped passage that can be rotated to interconnect one pair of ports or another pair of ports. In the positions shown, these valves ensure that fresh air is pumped through valve 60 and sieve 12 that concentrates it to relatively pure oxygen and through valve 54 and detector 62 to patient 64. At the same time, air is pumped from the atmosphere through heater 48 and valve 52 to the other molecular sieve 14 and thence through valve 56 to exit at port 60 back to atmosphere. When this air is heated by heater 48 it reactivates the material in sieve 14 and carries the nitrogen and moisture therefrom through port 60 to atmosphere. When detector 62 determines that the concentration of oxygen through sieve 12 is becoming insufficient, it signals control system 66 to operate all four of the valves, which are ganged together, to rotate 90° clockwise as seen in FIG. 8. This pumps air through sieve 14 to the patient 64 and air from heater 48 through sieve 12 and exit port 58 to atmosphere. Control system 66 also controls the period that heater 48 is switched on, which may be 30 seconds every five minutes. There may be isolation valves at the outlet port of heater 48 and at outlet ports 58, 60 to ensure that, once the relevant sieve 12, 14 is reactivated, it does not start to collect nitrogen and moisture before it is put back into use. Further, a moisture provider 68 may be inserted between detector 62 and patient 64.

While there has been disclosed what is considered to be the preferred embodiments of the invention, various changes and modifications may be made therein without departing from the scope of the invention.

I claim:

1. For an oxygen concentrator free of internal filtering elements and suitable for personal use to provide substantially pure oxygen for a medical patient to breathe, a molecular sieve, comprising:

a container formed of metal and including an inlet thereto and an outlet therefrom and seamed with all seams therebetween welded so as to be leak-proof to moisture and so that the molecular sieve is able to withstand passage of hot re-activating gas therethrough, said container having a longitudinal axis;

an oxygen concentrating molecular sieve material contained within said container, said sieve material having a longitudinal extent concentric with the longitudinal axis of said container; and a filter screen and spring combination positioned on opposite sides of said sieve material, coaxial with the longitudinal axis of said container for preventing the sieve material from moving around in said container to ensure an even gas flow, said sieve material and said filter screen and spring combination being coextensive with each other and with said sieve material and extending orthogonally to the longitudinal axis of said container, said filter screen being uniformly continuous and free of any interruption and extending the full internal diametrical extent of said container to prevent a dislocation or a moving around of said sieve material;

said sieve material being a material re-activatable by passage therethrough of a hot gas and being sandwiched between said filter screen and spring combination and maintained in alignment therewith and with said longitudinal axis of said container by said filter screen and spring combination.

2. The sieve as claimed in claim 1, wherein said container has an outer configuration in the form of a longitudinal tube and is provided with an end cap at each end thereof, said end caps having sides extending towards each other, and welding means for seam welding the sides of said end caps to the outer surface of said tube.

3. The sieve as claimed in claim 2, including retainers connected with said springs for assisting in holding said sieve material in place and to prevent shifting of said sieve material.

4. The sieve as claimed in claim 1, wherein said container includes ends caps, and including means welding said springs to said end caps for preventing said springs from shifting internally of said container.

5. The sieve as claimed in claim 4, wherein said welding means includes welds connecting said springs to an inner portion of said end caps.

6. The sieve as claimed in claim 1, wherein both said filter screen and said spring are each uniformly continuous in their transverse extent within said container and each are adjacent to the inner wall of said container.

7. The sieve as claimed in claim 1, wherein said sieve material and said filter screen are juxtaposed in face-to-face relationship to each other and each are uniformly continuous in a transverse direction orthogonal to said longitudinal axis.

8. The sieve as claimed in claim 1, wherein said container includes heat-resistive metal components together with said screen and spring combination coacting with end caps welded to a body portion of said container for holding said sieve material in place and oriented in a direction coaxial with said longitudinal axis and positioned at opposite ends of said sieve material, and said screen and spring combination being connected by welds to said caps for preventing shifting of said screen and spring combination relative to said sieve material in response to pressure on said container.

9. For an oxygen concentrator free of internal filtering elements and suitable for personal use to provide substantially pure oxygen for a medical patient to breathe, a molecular sieve, comprising:

a container formed of metal and including an inlet thereto and an outlet therefrom and seamed with all seams therebetween welded so as to be leakproof to moisture and so that the molecular sieve including said seams are able to withstand passage of a hot re-activating gas therethrough having a temperature of up to 800° F., said container having a longitudinal axis;

an oxygen concentrating molecular sieve material contained within said container, said sieve material having a longitudinal extent concentric with the longidinal axis of said container;

a filter screen and spring combination positioned on opposite sides of said sieve material, coaxial with the longitudinal axis of said container, said sieve material and said filter screen and spring combination being coextensive with each other and with said sieve material and extending orthogonally to the longitudinal axis of said container free of interruption, uniformly continuous and extending the full inner diametrical extent of said container and in contact with the inner wall of said container to prevent a dislocation or a movement around of said sieve material;

said sieve material being a material re-activatable by passage therethrough of a hot gas and being sandwiched between said filter screen and spring combination and maintained in alignment therewith and with said longitudinal axis of said container by said filter screen and spring combination; and means welding the screen of said filter screen and spring combination to said container for retarding movement of said sieve material past said filter screen and spring combination.

10. The sieve as claimed in claim 9, wherein said container includes heat-resistive metal components together with said screen and spring combination coacting with end caps welded to an outer body portion of said container for holding said sieve material in place and oriented in a direction coaxial with said longitudinal axis and positioned at opposite ends of said sieve material, and said springs being connected by welds to said caps.

11. The sieve as claimed in claim 10, wherein said inlet and said outlet each include a port fitting fitted to the sides of said end caps and seam welded thereto, said port fittings including rediussed tubes free of sharp bends, and said port fittings being proximate to said screen and spring combination.

12. The sieve as claimed in claim 9, wherein said container includes a tubular member having its opposite open ends closed by end caps, and said welding means includes welds connecting said springs to an inner portion of said end caps.

13. The sieve as claimed in claim 12, wherein said end caps include sides extending over said outer tubular member and said sides extend over the ends of said container in their assembled condition a distance which is between 2 to 4 cm.

14. The sieve as claimed in claim 9, wherein said sieve material and said filter screen are juxtaposed in face-to-face relationship to each other and each are uniformly continuous in a transverse direction orthogonal to said longitudinal axis.

15. The sieve as claimed in claim 9, including an end cap at each end of said container having aides extending towards each other and including welded seams between said end caps and said tube.

* * * * *